United States Patent [19]

Tokunaga

[11] Patent Number: 4,969,005

[45] Date of Patent: Nov. 6, 1990

[54] BACKLIGHTING DETECTING DEVICE

[75] Inventor: Tatsuyuki Tokunaga, Kanagawa, Japan

[73] Assignee: Canon Kabushiki Kaisha, Tokyo, Japan

[21] Appl. No.: 345,444

[22] Filed: May 1, 1989

[30] Foreign Application Priority Data

May 6, 1988 [JP] Japan ................. 63-111332

[51] Int. Cl.⁵ ............... G03B 15/05; G01J 1/42
[52] U.S. Cl. ....................... 354/414; 354/432; 356/221; 356/222
[58] Field of Search ............... 354/414, 419, 429, 430, 354/431, 432; 356/221, 222; 250/214 P

[56] References Cited

U.S. PATENT DOCUMENTS

4,445,778  5/1984  Nakauchi ................. 356/222
4,734,733  3/1988  Clapp et al. ............... 354/414
4,782,357 11/1988  Hayakawa et al. ...... 354/432 X
4,786,935 11/1988  Hayakawa et al. ...... 354/432

Primary Examiner—W. B. Perkey
Attorney, Agent, or Firm—Fitzpatrick, Cella, Harper & Scinto

[57] ABSTRACT

A device for detecting a backlighting condition comprising a light meter of which the image receiving surface is divided into a central area, an intermediate area and a marginal area, and a circuit for discriminating between true and false backlighting conditions in such a way that when the luminance of the marginal area is greater than that of the intermediate area by more than a predetermined value and when the luminance of the intermediate area is greater than that of the central area, the backlighting condition in question is taken as a true one.

11 Claims, 5 Drawing Sheets

FIG.1

FLASH ADJUSTING SENSOR

FIG.2

$$C = \frac{C_1 + C_2 + C_3 + C_4}{4}$$

FIG.6 FLOWCHART FOR THE WHOLE PHOTOGRAPHIC OPERATION

BACKLIGHTING DETECTING DEVICE

BACKGROUND OF THE INVENTION

1. Field of the Invention:

This invention relates to a backlighting detecting device for performing detection of the backlighting condition of a field of view.

2. Description of the Related Art:

The necessity of detecting the backlighting condition of a field of view arises in a situation where the luminance difference between a main subject portion and a background portion of a scene is so great that it is difficult to derive a proper exposure value for both the subject and the background. In more detail, the scene is such as that if the exposure is adjusted for the subject by using the spot light measuring mode or the like, a considerably large over-exposure will result in the portion of the background, because it is of high luminance. The use of the center-weighted average light measurement in view of a proper exposure over the entire area of the picture frame, on the other hand, will result in considerable under-exposure of the portion of the subject, because it is relatively low in luminance. Upon detecting such a backlighting condition, automatic fill-in flash may be fired. If so, even in such a scene, a good photograph can be taken of a portion of the subject saved from under-exposure, while nevertheless properly exposing a to portion of the background.

There has been a previous proposal for dividing the field of view into a plurality of areas, so that light measurement is performed by each one of the areas, and the light values obtained therefrom then being computed to detect whether the given photographic situation is in the backlighting condition.

For example, a light sensor responsive to the entire field of view and another light sensor responsive to a portion of the field of view are used in combination with a light measuring circuit, so that backlighting is detected by finding the difference between the two light values, as, for example, in Japanese Patent Publication No. Sho 47-34343. Another type a disclosed in Japanese Laid-Open Patent Application No. Sho 57-29036 is that the field of view is divided into a plurality of areas in which light measurement is performed, and the largest and smallest values are used in computation to detect the backlighting condition.

However, the prior known devices may encounter many situations where false backlighting detection results may be produced. For example, in the above-described Japanese Patent Publication No. Sho 47-34343, if the subject of principal interest is much smaller than the area of that sensor of partial responsibility, backlighting is impossible to detect.

Also, if the field of view surrounding the subject consists of a mixture of objects of high luminance and objects of lesser luminance (for example, in the landscape, a clear sky and the sun as the background and a shadowed earth as the foreground) then the light sensor for the integral field of view does not produce an output representing a very high light value. Even with a backlighting scene, therefore, some cases may be encountered where the backlighting condition is not detected as it stands.

The other of the above-described documents, Japanese Laid-Open Patent Application No. Sho 57-29036, does not take into consideration the discrimination between the subject and the background . In landscape photography, particularly when the scene consists of a mixture of dark parts, and, luminous parts a problem often arises that the backlighting detecting device detects a backlighting condition.

In U.S. Pat. No. 4,782,357, an attempt has been made to overcome this problem of detecting true backlighting conditions by utilizing a special light measuring pattern which has become the premise of the present invention.

A goal of the present invention is to assure detection of true backlighting accurately and reliably particularly in photographic situations where the field surrounding the subject consists of a mixture of luminous areas and dark areas.

SUMMARY OF THE INVENTION

One object of the invention is to provide a backlighting detecting device in which the field of view is divided into at least three concentric areas, namely, a central area, a first outer area adjacent the center, and a second outer area, so that the luminances of all the areas are individually measured and then compared with one another, whereby when the first outer area is more luminous than the central area by more than a first predetermined value, and when the second outer area is more luminous than the first outer area by more than a second predetermined value, the given lighting condition is detected as a backlighting condition.

DETAILED DESCRIPTION OF THE PREFERRED EMBODIMENT

Figure 1:
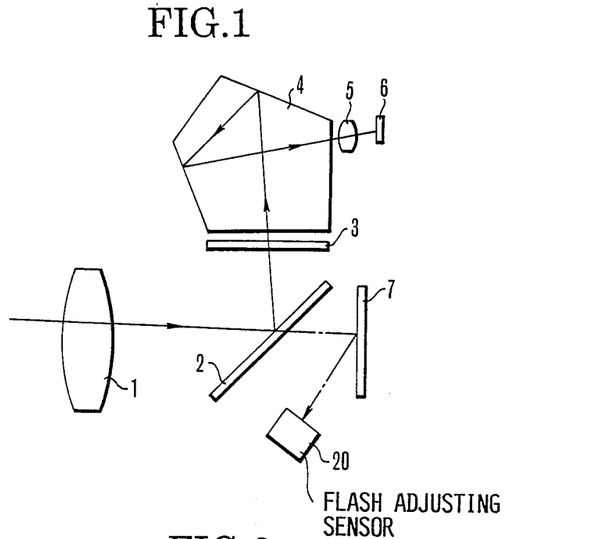
FIG. 1 is a schematic view of the optical system of an embodiment according to the invention applied to a single-lens reflex camera.

FIG. 1 in sectional view schematically shows the optical system of the single-lens reflex camera to which the invention is applied. The optical system comprises an interchangeable photographic lens 1, a quick-return mirror 2, a focusing screen 3, a pentagonal roof type prism 4, an image forming lens 5, a light meter 6, an image plane (film plane, or CCD surface) 7, and a flash adjusting sensor 20.

Figure 2:
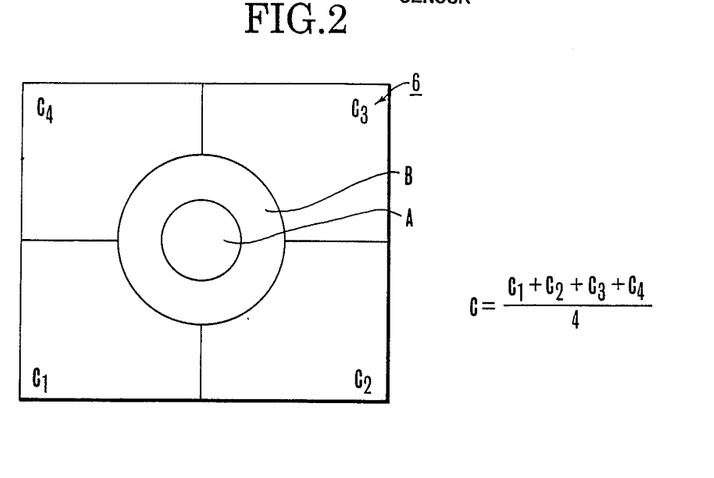
FIG. 2 is a plan view for of the division of the light receiving surface of the photosensitive means of FIG. 1 into a plurality of areas.

In the present embodiment, an image of an object to be photographed is formed by the photographic lens 1 on the focusing screen 3. For the purpose of measuring light, light radiating from the image is conducted by the prism 4 and focused by the lens 5 on the light meter 6. FIG. 2 shows, in enlarged scale, the light receiving surface of the light meter 6 shown in FIG. 1. In FIG. 2, "A" denotes a central area of the field of view; "B" denotes an intermediate area surrounding area A; and "C" denotes a marginal area divided into four parts $C_1$–$C_4$. In the present embodiment, use is made of six photosensitive elements positioned to receive respective light beams from the corresponding target areas to the areas shown in FIG. 2. Thus the field of view is divided into six areas A, B and $C_1$ to $C_4$, and the luminance of the field of view is measured by each area.

Figure 3:
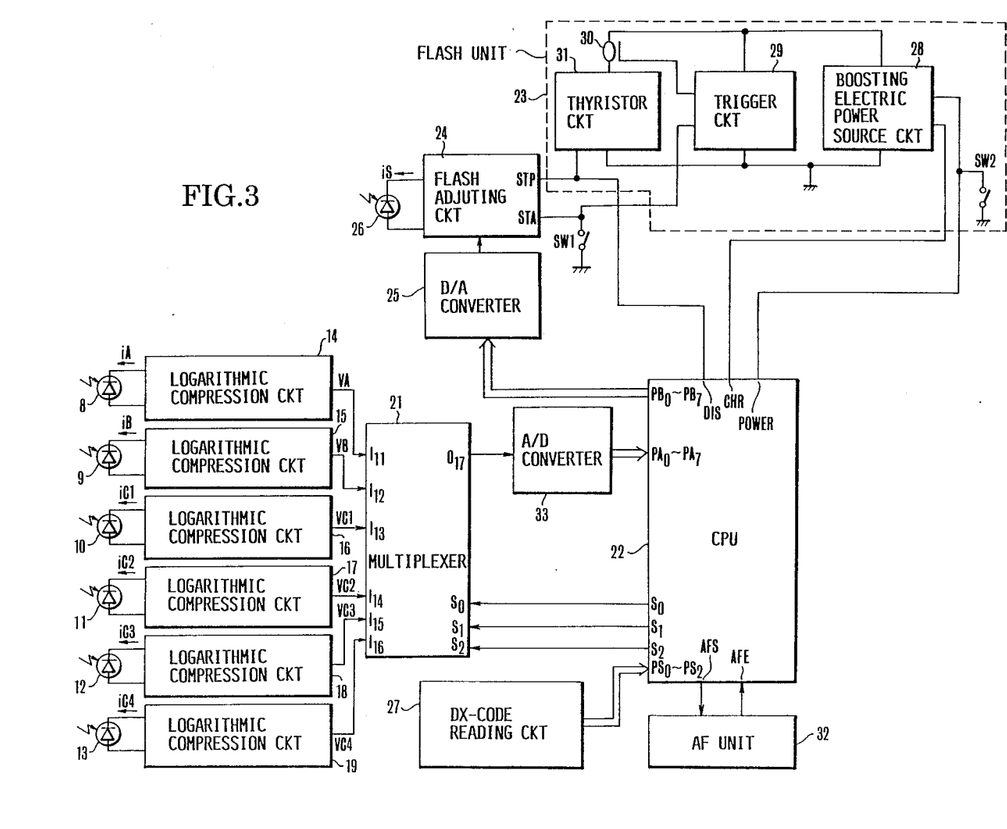
FIG. 3 is an electrical circuit diagram of an embodiment of the invention.
Figure 4:
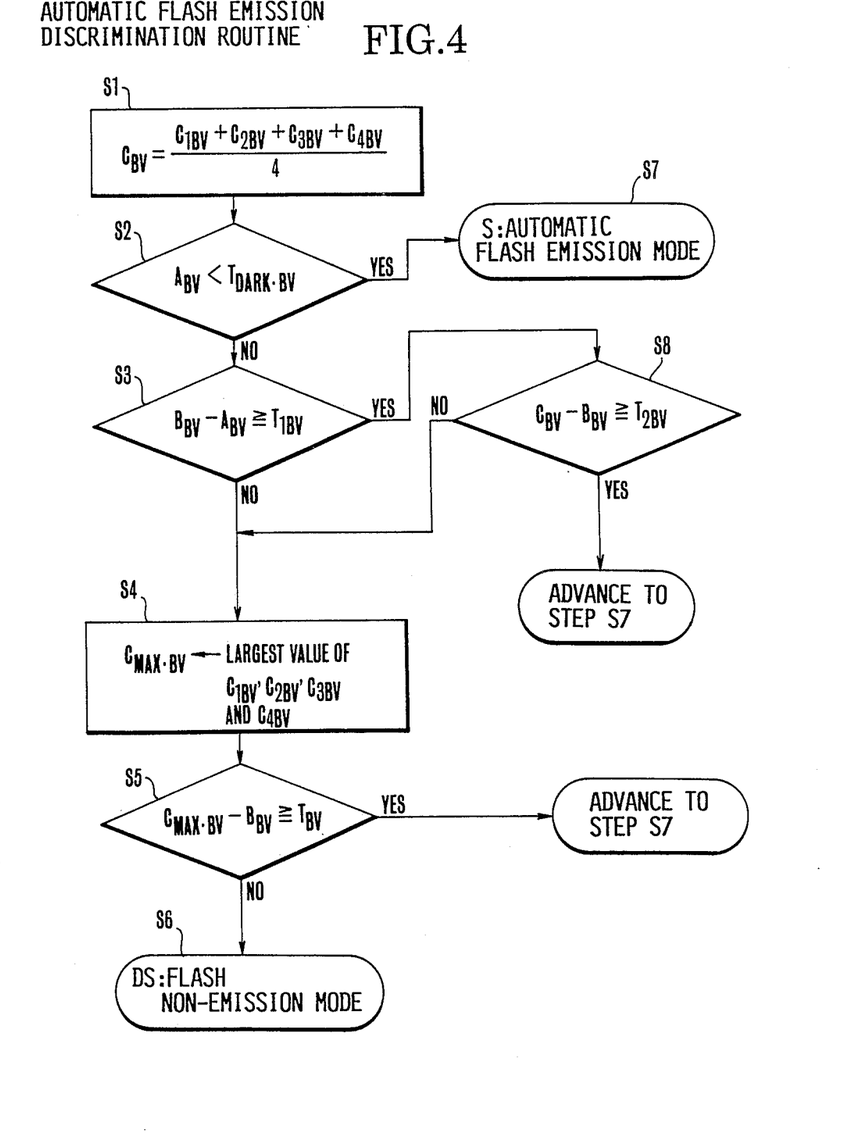
FIG. 4 is a flowchart of the embodiment of the invention.
Figure 5:
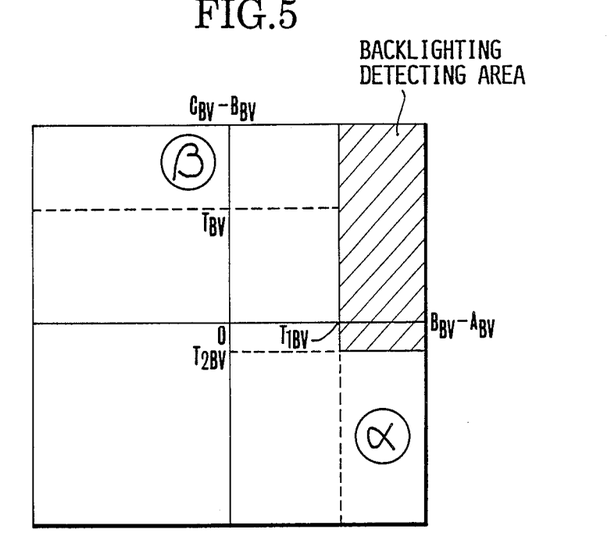
FIG. 5 is a diagram for explaining the expression of a backlighting detecting algorithm of the embodiment of the invention.

FIG. 3 is an electrical circuit diagram, partly in block form, of the embodiment of the invention. FIG. 4 is a flowchart for the operation of the circuit of FIG. 3. FIG. 5 shows an algorithm for detection of the backlighting.

In FIG. 3, six silicon photodiodes (SPDs) 8, 9, 10, 11, 12 and 13 corresponding to the above-described six areas A, B, $C_1$, $C_2$, $C_3$ and $C_4$ respectively produce photocurrents $i_A$, $i_B$, $i_{C1}$, $i_{C2}$, $i_{C3}$ and $i_{C4}$ proportional to the luminances of the respective areas. These photocurrents are logarithmically compressed by the respective logarithmic compression circuits 14 to 19, which produce outputs in the form of voltage values $V_A$, $V_B$, $V_{C1}$, $V_{C2}$, $V_{C3}$ and $V_{C4}$. The expression of the voltage values $V_A$, $V_B$, $V_{C1}$, $V_{C2}$, $V_{C3}$ and $V_{C4}$ by using constants: $a_1$, $a_2$, $a_3$, $a_4$, $a_5$ and $a_6$ ($<0$), a coefficient: b ($>0$) and the photocurrents $i_A$, $i_B$, $i_{C1}$, $i_{C2}$, $i_{C3}$ and $i_{C4}$ is given as follows:

$$V_A = a_1 + b \ln i_A$$

$$V_B = a_2 + b \ln i_B$$

$$V_{C1} = a_3 + b \ln i_{C1}$$

$$V_{C2} = a_4 + b \ln i_{C2}$$

$$V_{C3} = a_5 + b \ln i_{C3}$$

$$V_{C4} = a_6 + b \ln i_{C4}$$

where $a_1$, $a_2$, $a_3$, $a_4$, $a_5$ and $a_6$ are previously set to such values in the logarithmic compression circuits 14 to 19 so than when all the areas are of equal luminance, $V_A = V_B = V_{C1} = V_{C2} = V_{C3} = V_{C4}$. A multiplexer 21 receptive of the voltage values $V_A$, $V_B$, $V_{C1}$, $V_{C2}$, $V_{C3}$ and $V_{C4}$ at its input terminals $I_{11}$ to $I_{16}$, respectively, and responsive to signals arriving at its input terminals $S_0$, $S_1$ and $S_2$ from a CPU 22 for performing various kinds of computation for control, places one of them selectively onto its output terminal $O_{17}$.

An AF (Auto-Focus) unit 32 of the phase difference detection type known to those skilled in the art, when receiving a signal from a terminal AFS of the CPU 22, carries out an AF operation to drive a focusing lens (not shown) axially, and, when it terminates, sends a signal back to a terminal AFE of the CPU 22.

An A/D converter 33 receptive of the output from the terminal $O_{17}$ of the multiplexer 21 produces an output proportional to the luminance in digital form of the voltage value, which is supplied to the CPU 22.

Next, a flash adjusting circuit 24 at the time of flash emission is explained.

A silicon photodiode (SPD) 26 in the flash adjusting sensor 20 (see FIG. 1) generates a photocurrent $i_S$ proportional to the reflection of the light impinging on the image plane 7. The flash adjusting circuit 24 operates like the logarithmic compression circuits 14–19 to produce an output in the form of a voltage value $V_S$ proportional to the logarithm of the photocurrent $i_S$. When an X-sync contact SW1 is turned on, a signal is inputted to a terminal STA and the flash adjusting circuit 24 starts to integrate the product of the voltage value $V_S$ with a gain. This gain has a value representing the sensitivity in ISO of the used film sent from the CPU 22 through a D/A converter 25 when a DX-code reading circuit 27 reads information relating to the ISO sensitivity. When the integrated value reaches a certain level, a flash emission stop signal is sent from a terminal STP of the flash adjusting circuit 24 to a flash unit 23. The flash unit 23 comprises a boosting electric power source circuit 28, a trigger circuit 29, a flash discharge tube 30, and a thyristor circuit 31. Responsive to closure of an electric power source switch SW2, or a signal from a terminal POWER of the CPU 22, the boosting electric power source circuit 28 starts charging onto a main discharge capacitor (not shown) for the purpose of flash emission. After the capacitor is fully charged, it sends a signal to a terminal CHR of the CPU 22. When the X-sync contact SW1 turns on, the trigger circuit 29 causes the flash discharge tube 30 to start flash emission. By the flash emission stop signal from the flash adjusting circuit 24 (the signal of the terminal STP), the thyristor circuit 31 causes the flash discharge tube 30 to stop the flash emission. Again, the thyristor circuit 31 prohibits the flash discharge tube 30 from being fired for flash emission when a signal is output from a terminal DIS of the CPU 22.

Referring next to the flowchart of FIG. 4, the manner in which the circuit of FIG. 3 operates concerning the backlighting detection in the present embodiment is described below. A process prior to making the backlighting detection is first described.

As an AE (Auto-Exposure) sequence (light measuring routine) begins, the CPU 22 produces six different patterns of the signals at the terminals $S_0$, $S_1$ and $S_2$ successively, and in turn serially receives all the luminances of the 6-divided light measuring sensor. In the CPU 22, the six luminances are stored in a memory at successive addresses $A_{BV}$, $B_{BV}$, $C_{1BV}$, $C_{2BV}$, $C_{3BV}$ and $C_{4BV}$ respectively, and computation is performed as follows:

At first, the values of the luminances $C_{1BV}$–$C_{4BV}$ are averaged to obtain a luminance $C_{BV}$ in a step S1. Next, if $A_{BV} < T_{DARK \cdot BV}$ (where $T_{DARK \cdot BV}$: A low luminance threshold level for automatic flash emission) is found in a step S2, then the process advances to a step S7 to render operative the automatic flash emission mode. If $A_{BV} \geq T_{DARK \cdot BV}$, then $B_{BV} - A_{BV}$ and $C_{BV} - B_{BV}$ are determined in a step S3 and a step S8, respectively, to determine whether they are are after than respective predetermined levels $T_{1BV}$ and $T_{2BV}$. If both are satisfied, then the process advances to the step S7 to render operative the automatic flash emission mode, because the given situation is determined to be a backlighting condition. Otherwise, the process advances to a step S4. In the step S4, largest value among the luminances $C_{1BV}$–$C_{4BV}$ is designated as $C_{max \cdot BV}$ to take its difference from the luminance $B_{BV}$. If the difference is not less than a predetermined level $T_{BV}$ determined in a step S5, then the process advances to the step S7 to render operative the automatic flash emission mode because of the detection of a backlighting condition. Otherwise, the process advances to a step S6. When the automatic flash emission mode with the flash unit is set in step S7, the CPU 22 produces a signal at the terminal POWER to command a initiation of a charging the flash unit. Then, upon receipt of the signal at the terminal CHR, the CPU 22 terminates the charging. Incidentally, the CPU 22 does not produce the signal at the terminal DIS. In the step S6, on the other hand, because the flash non-emission mode is rendered operative, the CPU 22 produces the signal at the terminal DIS to prohibit flash emission from occurring.

In the light measurement routine, the CPU 22 determines an exposure value. This is derived by computing a value based on the formula:

$$E_{BV} = (A_{BV} + B_{BV} + C_{BV})/3$$

and the film sensitivity $S_{BV}$ inputted from the DX-code reading circuit 27. This computation is made the same between the automatic flash emission mode and the flash non-emission mode with an advantage that in a critical situation of whether to adopt the automatic flash emission, the exposure value is prevented from differing largely. Such a light measurement is assumed to be performed with the subject of principal photographic interest at the central portion of the field of view at the same time when the AF operation is carried out. If the subject is located outside the central area, the user, after the recourse to the automatic AF and AE locks, turns to freely move the picture frame so that the subject takes the desired place, and then will actuate a camera release.

FIG. 5 depicts the algorithm of the backlighting detection in the steps S3 and S8 for the purpose of better understanding.

$B_{BV} - A_{BV} \geq T_{1BV}$ may result when the subject in the field of view is just equal in size to the area A of the light measuring surface of the light meter 6, and the background occupies the intermediate area B, and when the luminance difference between the subject and the background is higher than the predetermined level $T_{1BV}$, or the subject is darker. Hence the given lighting situation can be judged as the backlighting one. For this case, it is recommended to use the fill-in flash in taking a shot. Yet, for $C_{BV} - B_{BV} < T_{2BV}$ (in the figure, $\alpha$), the area C is darker than the area B. That is, among the light measuring areas A, B and C, only the area B is luminous. This cannot be said in the general case to be a backlighting scene. Therefore, this situation is not judged as a backlighting condition.

Since the light measuring area C is responsive to the margin of the field of view, it is expected in some scenes that the sky and the earth or a mixture of various luminances enter the picture at once. In this situation, when the subject occupies up to the intermediate light measuring area B (a size equal to the sum of the area A and the area B,) the use of the average of the area C in comparison with the area B does not always assure production of an appreciable difference between $C_{BV}$ and $B_{BV}$ as in the landscape with a clear sky and a shadowed foreground. So, the backlighting detection cannot be reliably performed (in the figure, $\beta$). Hence, in the embodiment of the invention, use is made of $C_{max \cdot BV}$ in computing the difference from between $B_{BV}$, when backlighting detection is performed. Thus, the invention makes it possible to limit the effective backlighting detection just to the true backlighting situations such as that when a luminous portion of the field of view lies in the background, while the subject is shadowed against it.

Figure 6:
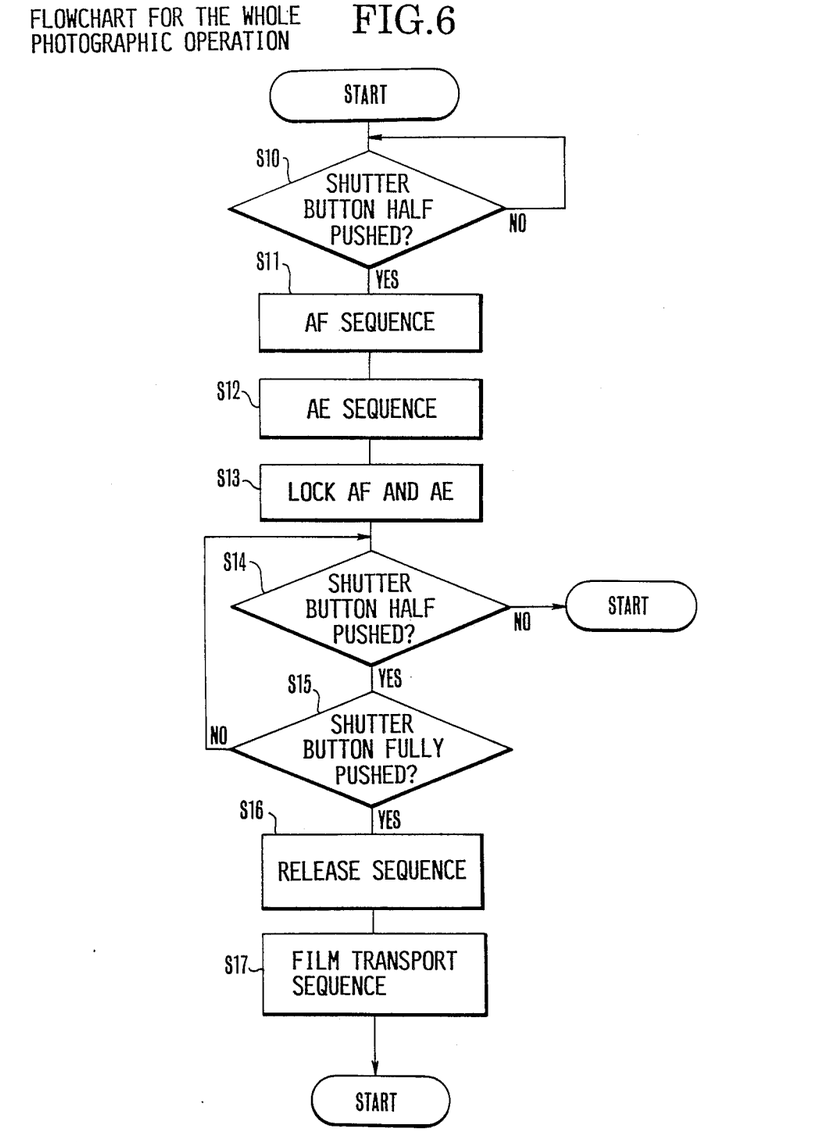
FIG. 6 is a flowchart of the sequence of the complete operation to take a shot.

FIG. 6 shows a flow diagram of all the operational steps to take a shot. The photographer first puts a main object in registry with the central portion of the field of view and then pushes the shutter button to a half stroke (step S10). The camera responsive to that aligned field of view performs the AF operation and the AE operation and locks them individually (steps S11–S13). It is to be noted here that if the photographer removes his finger from half-pushed position of the shutter button, the AF operation and the AE operation are unlocked and the camera returns to the initial position (step S14). The photographer while keeping the shutter button in the half-pushed position may change the framing until a desired composition is attained, and then further pushes the shutter button to the full stroke (step S15). Responsive to this, the camera focuses the lens on the main object and makes a proper exposure for the main object. If the main object is backlighted, the flash unit is fired when the camera release is actuated (step S16). When the release sequence ends, a film transport is automatically carried out (step S17). Thus, the camera returns to the initial position. If his desired framing is with the main object at the center of the field of view, the photographer may push the shutter button straight to the full stroke. In this case, the above-described shooting operation sequences without the loops.

Though the embodiment has been described in connection with the light measuring sensor of the type operating in three radially divided areas from the central portion of the field of view to the margin and four circumferentially divided sections of the marginal area, another type of light measuring sensor having a greater number of areas and sections may be used to achieve a further improvement of the accuracy and reliability. Also, the flash unit may be either independent of the camera or built in the camera.

Also, each of the threshold levels $T_{1BV}$, $T_{2BV}$ and $T_{BV}$ for backlighting detection may otherwise be made adjustable depending on the situation. If so, delicate alteration of the threshold levels according to the luminance $C_{BV}$ which takes different values on the assumption that the day is fine or overcast will lead to a possibility of performing a better backlighting detection. The computations and the backlighting detection, besides their being performed by using a microcomputer with software, may otherwise be performed by using hardware comprising a logic circuit and comparators. Also, in the above-described embodiment, when the fill-in flash mode has not been discriminated (selected), the luminance signals of the central area of the field of view and the area surrounding it are only averaged. But, it is also possible that the difference between the luminance signals of the main object portion and the background portion is utilized in automatically applying correction to the exposure value. Also, even when the fill-in flash mode has been selected, the differences in luminance signal between any two of the sections of the marginal light measuring area can be utilized in deriving a more proper exposure value. For this purpose, the backlighting detecting device may be provided with a marginal luminance computing circuit.

It is to be understood that the present invention is not confined to the single-lens reflex camera, and is advantageously applicable to lens shutter cameras, etc.

As has been described above, this embodiment of the invention has achieved realization of a backlighting detecting device which can discriminate between true and false backlighting conditions with high accuracy and high reliability.

What is claimed is:

1. A detecting device comprising:
light receiving means for obtaining a luminance value for each of a plurality of areas into which a field of view is divided, said plurality of areas including at least a central area at a central portion of the field of view, a first outer area surrounding said central area and a second outer area surrounding said first outer area; and a detecting circuit for detecting a backlighting condition on the basis of the luminance values obtained by said light receiving means, said detecting circuit detecting a backlighting condition when the luminance value of said second outer area is greater than the luminance value of said first outer area by more than a first predetermined value and when the luminance of said first outer area is greater than the luminance of said central area by more than a second predetermined value.

2. A device according to claim 1, wherein said second outer area is further divided into a plurality of smaller areas to obtain a luminance value for each of said plurality of smaller areas, and wherein the luminance value corresponding to said second outer area is an average value of luminance values of said plurality of smaller areas.

3. A device according to claim 1, wherein said detecting circuit makes it a prerequisite to the detection of a backlighting condition that the luminance value of said central area is greater than a third predetermined value.

4. A camera comprising:

light receiving means for obtaining a luminance value for each of a plurality of areas into which a field of view is divided, said plurality of areas including at least a central area at a central portion of the field of view, a first outer area surrounding said central area and a second outer area surrounding said first outer area; and a detecting circuit for detecting a backlighting condition on the basis of luminance values obtained by said light receiving means, said detecting circuit detecting a backlighting condition when the luminance value of said second outer area is greater than the luminance value of said first outer area by more than a first predetermined value and when the luminance value of said first outer area is greater than the luminance value of said central area by more than a second predetermined value;

a flash unit; and a control circuit for causing said flash unit to emit a flash with predetermined timing when said detecting circuit has detected a backlighting condition.

5. A camera according to claim 4, wherein said flash unit has a switch capable of selecting an operational mode for assuring flash emission, and wherein when said detecting circuit has detected a backlighting condition, said control circuit causes said flash unit to emit a flash even if said switch has not selected said operational mode.

6. A detecting device comprising:

light receiving means for obtaining a luminance value for each of a plurality of areas into which a field of view is divided, said plurality of areas being grouped broadly into a marginal area which is the outer area of the field of view and an inner area which is at least a portion of the area within said marginal area, and said marginal area being further divided into a plurality of smaller areas; and a detecting circuit for detecting a backlighting condition on the basis of luminance values obtained by said light receiving means, wherein when the greatest luminance value among the luminance values of said plurality of smaller areas is greater than the luminance value of said inner area by more than a fourth predetermined value, said detecting circuit detects a backlighting condition.

7. A device according to claim 6, wherein said inner area is further divided into a plurality of smaller inner areas to obtain a luminance value for each of said plurality of smaller inner areas, and wherein the luminance value to be used in comparison by said detecting circuit is one of luminance values of said plurality of smaller inner areas.

8. A camera comprising:

light receiving means for obtaining a luminance value for each of a plurality of areas into which a field of view is divided, said plurality of areas being grouped broadly into a marginal area which is the outer area of the field of view and an inner area which is at least a portion of the area within said marginal area, and said marginal area being further divided into a plurality of smaller areas; and a detecting circuit for detecting a backlighting condition on the basis of luminance values obtained by said light receiving means, wherein when the greatest luminance value among the luminance values of said plurality of smaller areas is greater than the luminance value of said inner area by more than a fourth predetermined value, said detecting circuit detects a backlighting condition;

a flash unit; and a control circuit for causing said flash unit to emit a flash with predetermined timing when said detecting circuit has detected a backlighting condition.

9. A camera according to claim 8, wherein said flash unit has a switch capable of selecting an operational mode for assuring flash emission, and wherein when said detecting circuit has detected a backlighting condition, said control circuit causes said flash unit to emit a flash even if said switch has not selected said operational mode.

10. A device according to claim 1, wherein said second outer area is divided into a plurality of small areas, said device further comprising:

a second detecting circuit for detecting a backlighting condition on the basis of luminance values obtained by said light receiving means, wherein when the greatest luminance value among said plurality of small areas is greater than the luminance value of said first outer area and/or said central portion by more than a fourth predetermined value, said second detecting circuit detects a backlighting condition.

11. A camera according to claim 4, wherein said second outer area is divided into a plurality of small areas, said camera further comprising:

a second detecting circuit for detecting a backlighting condition on the basis of luminance values obtained by said light receiving means, wherein when the greatest luminance value among said plurality of small areas is greater than the luminance value of said first outer area and/or said central portion by more than a fourth predetermined value, said second detecting circuit detects a backlighting condition.

* * * * *

UNITED STATES PATENT AND TRADEMARK OFFICE
CERTIFICATE OF CORRECTION

PATENT NO. : 4,969,005

DATED : November 6, 1990

INVENTOR(S) : Tatsuyuki TOKUNAGA

It is certified that error appears in the above-identified patent and that said Letters Patent is hereby corrected as shown below:

In the Drawings

At Sheet 2:

Figure 3, "ADJUTING" should read --ADJUSTING--.

COLUMN 1:

Line 29, "to" should be deleted, and

Line 42, "a" should read --as--.

COLUMN 2:

Line 2, "parts, and, luminous parts" should read --parts and luminous parts,--;

Line 33, "for" should be deleted;

Line 38, "the embodiment" should read --an embodiment--;

Line 40, "for explaining the expression" should be deleted; and

Line 41, "the" should read --an--.

COLUMN 3:

Line 19, "(<0)," should read --($\leq$0),--; and

Line 36, "than" should read --that--.

UNITED STATES PATENT AND TRADEMARK OFFICE
CERTIFICATE OF CORRECTION

PATENT NO. : 4,969,005
DATED : November 6, 1990
INVENTOR(S) : Tatsuyuki TOKUNAGA It is certified that error appears in the above-identified patent and that said Letters Patent is hereby corrected as shown below:

COLUMN 4:

Line 47, "are are after" should read --are greater--;

Line 53, "largest" should read --the largest--; and

Line 63, "a" (both occurrences) should be deleted.

Signed and Sealed this

Twenty-eighth Day of July, 1992

Attest:

DOUGLAS B. COMER

Attesting Officer

Acting Commissioner of Patents and Trademarks